United States Patent
Döring et al.

(10) Patent No.: US 11,645,322 B2
(45) Date of Patent: May 9, 2023

(54) METHOD AND ANALYTICAL ENGINE FOR A SEMANTIC ANALYSIS OF TEXTUAL DATA

(71) Applicants: Lysander Fabian Döring, Munich (DE); Fritz Schinkel, Unterhaching (DE); Gerald Ulmer, Herrsching am Ammersee (DE)

(72) Inventors: Lysander Fabian Döring, Munich (DE); Fritz Schinkel, Unterhaching (DE); Gerald Ulmer, Herrsching am Ammersee (DE)

(73) Assignees: Siemens Aktiengesellschaft, Munich (DE); Fujitsu Technology Solutions Intellectual Property GmbH, Munich (DE)

( * ) Notice: Subject to any disclaimer, the term of this patent is extended or adjusted under 35 U.S.C. 154(b) by 146 days.

(21) Appl. No.: 16/952,426

(22) Filed: Nov. 19, 2020

(65) Prior Publication Data
US 2021/0157831 A1 May 27, 2021

(30) Foreign Application Priority Data
Nov. 26, 2019 (EP) .................... 19211572

(51) Int. Cl.
*G06F 17/00* (2019.01)
*G06F 16/36* (2019.01)
*G06F 16/93* (2019.01)
*G06F 16/34* (2019.01)
*G06F 16/335* (2019.01)
*G06F 40/30* (2020.01)

(52) U.S. Cl.
CPC ............ *G06F 16/36* (2019.01); *G06F 16/335* (2019.01); *G06F 16/34* (2019.01); *G06F 16/93* (2019.01); *G06F 40/30* (2020.01)

(58) Field of Classification Search
CPC ........ G06F 16/36; G06F 16/335; G06F 16/34; G06F 16/93; G06F 16/367; G06F 16/35; G06F 40/30
See application file for complete search history.

(56) References Cited

U.S. PATENT DOCUMENTS

| | | | |
|---|---|---|---|
| 7,831,559 B1 * | 11/2010 | Mohan ................ | G06F 16/283 |
| | | | 707/956 |
| 10,325,023 B2 * | 6/2019 | Yamagami ............ | G16H 50/20 |

(Continued)

OTHER PUBLICATIONS

Hassini, Badr, et al., "Evaluation of Semantic Similarity Using Vector Space Model Based on Textual Corpus", 1026 International Conference on Computer Graphics, Imaging, and Visualization, Mar. 1, 2016, pp. 295-300. (Year: 2016).*

(Continued)

*Primary Examiner* — Laurie A Ries
(74) *Attorney, Agent, or Firm* — Lempia Summerfield Katz LLC

(57) ABSTRACT

Methods for analyzing text corpora for inferring potential threats and risks are becoming ever more established. While the present achievements are based on an analyst-driven analytical process, the embodiments provide for a semantic analysis of dynamic developments in changing text corpora, involving an acquisition of text corpora, application of a probabilistic concept model, and providing a similarity remapping.

19 Claims, 2 Drawing Sheets

(56) References Cited

U.S. PATENT DOCUMENTS

| | | | |
|---|---|---|---|
| 10,943,071 B2* | 3/2021 | Walker | G06F 40/205 |
| 11,418,331 B1* | 8/2022 | Villapakkam | H04L 9/0861 |
| 2003/0093432 A1* | 5/2003 | Fujita | G06F 16/287 |
| 2004/0059736 A1* | 3/2004 | Willse | G06F 40/20 |
| 2005/0165600 A1* | 7/2005 | Kasravi | G06F 40/194 |
| | | | 704/9 |
| 2006/0116994 A1* | 6/2006 | Jonker | G06Q 10/04 |
| 2014/0172417 A1* | 6/2014 | Monk, II | G06F 40/30 |
| | | | 704/9 |
| 2014/0351694 A1* | 11/2014 | Verma | G06F 40/284 |
| | | | 715/237 |
| 2015/0278198 A1* | 10/2015 | Andreev | G06F 40/268 |
| | | | 704/9 |
| 2016/0232160 A1 | 8/2016 | Buhrmann | |
| 2017/0004129 A1* | 1/2017 | Shalaby | G06F 40/242 |
| 2017/0116204 A1* | 4/2017 | Davulcu | G06F 16/355 |
| 2018/0121539 A1* | 5/2018 | Ciulla | G06F 16/3344 |
| 2018/0246883 A1* | 8/2018 | Wang | G06N 5/045 |
| 2019/0026376 A1* | 1/2019 | Ho | G06F 16/9535 |
| 2019/0073414 A1* | 3/2019 | Franceschini | G06N 5/003 |
| 2020/0265102 A1* | 8/2020 | Ho | G06F 16/243 |

OTHER PUBLICATIONS

European Search Report for European Application No. 19211572.3-1213 dated May 8, 2020.

* cited by examiner

METHOD AND ANALYTICAL ENGINE FOR A SEMANTIC ANALYSIS OF TEXTUAL DATA

The present patent document claims the benefit of European Patent Application No. 19211572.3, filed Nov. 26, 2019, which is hereby incorporated by reference.

TECHNICAL FIELD

The present disclosure relates to semantic analysis of textual data. More specifically, the present disclosure relates to computational methods and analytical engines for semantic analysis of textual corpora.

BACKGROUND

The availability and amount of information that people throughout the world are exposed to is incredible. It is desirable to have tools that help manage the massive amount of information available to people and organizations and to analyze and provide desired information or results from that analysis that is more focused, concise, and better suited for their needs. As a result, a number of methods have been developed that help to manage the massive amount of information available by semantically analyzing textual corpora, providing classification and further insight.

A main task of a semantic analysis is to automatically determine a pertinent category according to the contents of textual information. A common model of a statistics-based document analysis and classification method is referred to as a Latent Dirichlet Allocation model.

The Latent Dirichlet Allocation model is a probabilistic concept model and may be used to identify latent concept information in a large-sized document set or corpus. The Latent Dirichlet Allocation model uses a bag-of-words method, in which text corpora are regarded by a word frequency vector, so that semantic information is changed into digital information that may be suitably modeled. A text corpus is represented by a probability distribution formed by a number of concepts, wherein a concept represents a probability distribution formed by a number of terms.

Semantic analysis of text corpora, (such as news articles, official announcements, or political reports), may support an identification and assessment of actual and potential threats and in extension risks bearing the potential to affect companies or key individuals of such companies. In order to enable appropriate response measures for mitigating potential damages associated with a risk, it is desirable to gain a regularly updated survey on various types of threats, a likelihood of such threats, and potential consequences arising from such threats.

The prior art methods, however, lack certain capabilities. For example, prior semantic analysis methods may not consider dynamic developments of changing text corpora to be analyzed, e.g., changes in value of information over time or a changing scope of interest.

Accordingly, there is a need in the art for a semantic analysis of textual data which is capable of tracking a dynamic nature in the text corpora to be analyzed.

SUMMARY

The present embodiments may be directed to providing system and method for semantic analysis of textual data. The scope of the present disclosure is defined solely by the appended claims and is not affected to any degree by the statements within this summary. The present embodiments may obviate one or more of the drawbacks or limitations in the related art.

In one embodiment, a method for a semantic analysis of textual data is provided. The method includes acquiring, (e.g., at subsequent points in time), a first and a second text corpus, each of the text corpora including textual data to be analyzed. The method further includes applying a probabilistic concept model to each of the text corpora to respectively generate a first concept vector set associated with the first text corpus and a second concept vector set associated with the second text corpus, each of the concept vector sets including a set of concept vectors and each concept vector including a plurality of terms semantically corresponding to the semantic concept and a semantic probability assigned to each term. The method further includes applying a similarity remapping to at least one concept vector in the first and second concept vector set to obtain an ordered sequence of remapped concept vectors so that each remapped concept vector has a minimal concept distance measure in relation to at least one concept vector of the respective other concept vector set, wherein the similarity remapping of the at least one concept vector includes a permutation of its plurality of terms. The method further includes outputting the ordered sequence of remapped concept vectors of the first concept vector set and the second concept vector set for a semantic trend analysis of the text corpora.

According to another embodiment, a transformation unit is provided, wherein the transformation unit includes a processor and a data storage device having a computer executable program code stored thereon. The data storage device may be implemented within or external to the processor.

According to a further embodiment, a non-transitory computer-readable storage medium is provided, wherein the storage medium has a computer executable program code stored thereon.

DESCRIPTION OF THE DRAWINGS

The objects as well as further advantages of the present embodiments will become more apparent and readily appreciated from the following description of the embodiments, taken in conjunction with the accompanying drawings in which.

DETAILED DESCRIPTION

In recent times, methods for detecting and analyzing possible threats are becoming ever more established. Globally operating companies employ analysts for collecting, storing, managing, and utilizing information associated with potential threats and risks potentially affecting the company or its key individuals. For the sake of efficiency, early detections of emergent developments and changes in a threat landscape require a facilitation in form of automated data management by an analysis system supporting analysts involved in an assessment of the threat landscape.

One of the crucial requirements of such semantic analysis systems is an ability of instantly integrating additional sources of textual corpora into existing workflows for analytical evaluation and further processing by the system.

The present achievements, however, are based on a classic, highly manually and analyst-driven analytical process, which is both labor-intensive and time-consuming. Presently available analysis systems are either inflexible and not conducive to a particular use case or not covering the entire range of central features and functions.

To date, global developments influencing the threat landscape, have to be identified, tracked, and used for analytical purposes by a human analyst. The ability to proactively identify relevant phenomena and constituent events in an observed textual data pool, as well as the ability of deriving trend statements from them, is still highly limited.

A known application of natural language processing, or NLP, approaches for semantically analyzing large text corpora does not by itself solve an analyst's need for a proactive identification of relevant phenomena and their dynamic observation over time in order to derive trend statements in the threat landscape.

Embodiments of the present disclosure address these above drawbacks by providing a semantic analysis for an analysis of dynamic developments in subsequently changing text corpora, involving an acquisition, (e.g., at subsequent points in time), of a number of text corpora, applying a probabilistic concept model to each of the corpora and applying a similarity remapping.

Figure 1:
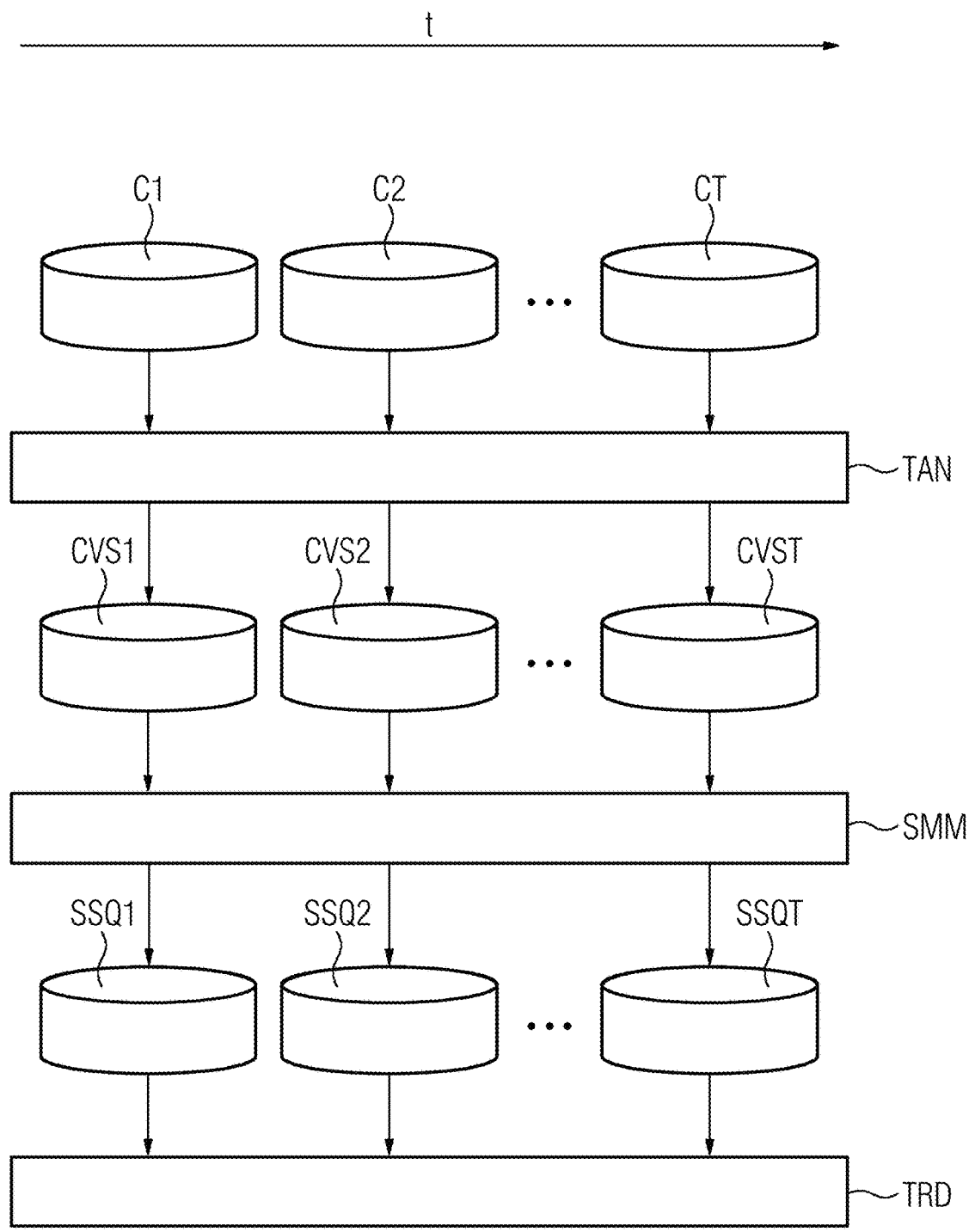
FIG. 1 depicts a schematic view of different components associated with a semantic analysis of textual data according to an embodiment.

FIG. 1 depicts a schematic view of different components associated with an embodiment of the present disclosure.

A first corpus C1 including textual data to be analyzed is acquired and assigned to a text analysis module TAN. By the text analysis module TAN, a probabilistic concept model is applied to the first corpus C1 resulting in a first concept vector set CVS1. The concept vector set CVS1 includes one or more concept vectors wherein each concept vector is an ordered or unordered assembly of textual terms which are semantically corresponding or semantically related to the given concept of the concept vector. The concept vector further includes a semantic probability, expressed by a number between 0 and 1, assigned to each term within the concept vector.

An exemplary concept vector for the concept »mathematics« may have a structure as follows:

$$c = \begin{pmatrix} \text{algorithm} & 0.005 \\ \text{equation} & 0.002 \\ \text{matrix} & 0.0005 \\ \text{integral} & 0.0002 \\ \text{limit} & 0.0001 \end{pmatrix}$$

The concept vector »mathematics« includes semantically related terms (exemplary: algorithm, equation, matrix, integral, limit) as shown. These terms are ordered by their probability in a given text corpus. The probability assigned to a term is shown on the right of the respective term. The most probable term »algorithm« with a probability of 0.005 is top ranked in the exemplary concept vector »mathematics« as shown above.

After conclusion of the first concept vector set CVS1, a second corpus C2 is acquired and applied by analogy to the text analysis module TAN in order to produce a second concept vector set CVS2 in accordance with to the foregoing description.

According to an embodiment, a multiplicity of corpora (symbolized by dots in the drawing) is acquired until a $T^{th}$ corpus CT has been reached. The respective corpora are applied by analogy to the text analysis module TAN in order to produce respective concept vector sets (symbolized by dots in the drawing) and concluded by a $T^{th}$ concept vector set CVST according to the foregoing description.

The corpora C1, C2, . . . , CT may be acquired simultaneously or at subsequent points in time. An imaginary horizontal timeline t is assigned to an acquisition of the first corpus C1, the second corpus C2, and the $T^{th}$ corpus CT and, accordingly, the first concept vector set CVS1, the second concept vector set CVS2 and the $T^{th}$ concept vector set CVST in this sequence. The directed timeline t runs from left to right, so that later time points are further right in the drawing than earlier time points.

For the collection of corpora C1, C2, . . . , CT or mathematically written by a lower corpus index t:

$$\text{Corpus}_t \text{ with } t=1,2,\ldots T$$

The corpora are acquired or produced at subsequent points in time.

The text analysis module TAN applies an analysis A based on a probabilistic concept model, designating at least one concept to each corpus C1, C2, . . . , CT and producing at least one concept vector set:

$$A(\text{Corpus}_t)=(c_1{}^t, c_2{}^t, \ldots c_N{}^t).$$

A concept vector $c_N{}^t$ in a concept vector set $(c_1{}^t, c_2{}^t \ldots c_N{}^t)$ includes an upper corpus index t for the current corpus C1, C2, . . . , CT and a lower concept index 1, 2, . . . , N for a number N of concept vectors included in the concept vector set for the given corpus t=1, 2, . . . , T.

Accordingly, the first concept vector set of the first corpus C1 is written as $c_1{}^1 c_2{}^1 \ldots c_N{}^1$, the second concept vector set of the second corpus C2 is written as $c_1{}^2 c_2{}^2 \ldots c_N{}^2$, and the $T^{th}$ concept vector set of the $T^{th}$ corpus CT is written as $c_1{}^T c_2{}^T \ldots c_N{}^T$.

An exemplary mathematical expression of the first concept vector (as expressed by a lower index of 1 at the first digit position) of the second corpus C2 (as expressed by an upper index of 2) is shown below:

$$c_1^2 = \begin{pmatrix} c_{11}^2 & p(c_{11}^2) \\ c_{12}^2 & p(c_{12}^2) \\ c_{13}^2 & p(c_{13}^2) \\ c_{14}^2 & p(c_{14}^2) \\ c_{15}^2 & p(c_{15}^2) \end{pmatrix}$$

The first concept vector $c_1{}^2$ includes five terms $c_{11}{}^2$, $c_{12}{}^2$, $c_{13}{}^2$, $c_{14}{}^2$, and $c_{15}{}^2$, which are semantically related to the (not shown) concept of the first concept vector $c_1{}^2$. The second digit position of the lower index of a term characterizes the order of the term (which is mathematically a vector element) within the first concept vector $c_1{}^2$. A probability $p(c_{11}{}^2)$, $p(c_{12}{}^2)$, $p(c_{13}{}^2)$, $p(c_{14}{}^2)$, and $p(c_{15}{}^2)$ is respectively assigned to each term $c_{11}{}^2$, $c_{12}{}^2$, $c_{13}{}^2$, $c_{14}{}^2$, and $c_{15}{}^2$ of the first concept vector $c_1{}^2$.

According to an embodiment, a similarity remapping SMM is applied to the concept vectors in the concept vector sets CVS1, CVS2, . . . , CVSN, wherein a permutation in the second argument $\pi$: $\{1, 2, \ldots T\} \times \{1, 2, \ldots N\} \to \{1, 2, \ldots N\}$ with $\pi(t,\bullet)$: $\{1, 2, \ldots N\} \to \{1, 2, \ldots N\}$ is a permutation of the set $\{1, 2, \ldots N\}$ for every first fixed argument $t \in \{1, 2, \ldots T\}$.

Thereby, the plurality of terms within a concept vector is determined such that for each two corpus indices $t_1, t_2 \in \{1, 2, \ldots T\}$ and each concept index $n \in \{1, 2, \ldots N\}$ the remapped concept vector $c_{\pi(t_1,n)}^{t_1}$ is most similar (e.g., least distinctive) to the remapped concept vector $c_{\pi(t_2,n)}^{t_2}$ when considering all possible concepts in $A(Corpus_{t_2})$.

Turning back to the similarity remapping SMM applied to the concept vectors in the concept vector sets CVS1, CVS2, ..., CVSN, the permutation rule $\pi$: $\{1, 2, ... T\} \times \{1, 2, ... N\} \rightarrow \{1, 2, ... N\}$ is applied, which means that each fixed first argument $t=1, 2, ... T$ $\pi(t,\bullet)$: $\{1, 2, ... N\} \rightarrow \{1, 2, ... N\}$ is a permutation of the set $\{1, 2, ... N\}$.

Mathematically, the vector distance between the remapped concept vector of the first corpus $c_{\pi(t_1,n)}^{t_1}$ and the remapped concept vector of the second corpus $c_{\pi(t_2,n)}^{t_2}$ is determined to be a minimum in relation to at least one concept vector (e.g., all concept vectors) of the respective other concept vector set, or mathematically written as:

$$dist(c_{\pi(t_1,n)}^{t_1}, c_{\pi(t_2,n)}^{t_2}) = \min_{m \in \{1,2,...N\}} dist(c_{\pi(t_1,n)}^{t_1}, c_m^{t_2})$$

The calculation rule for the similarity remapping shown above means, in other words, that the vector distance between the remapped concept vector of the first corpus $c_{\pi(t_1,n)}^{t_1}$ and the remapped concept vector of the second corpus $c_{\pi(t_2,n)}^{t_2}$ is determined to be a minimum of all possible distances between the remapped concept vector of the first corpus $c_{\pi(t_1,n)}^{t_1}$ and all concept vectors $c_m^{t_2}$ with $m \in \{1, 2, ... N\}$.

According to an embodiment, the similarity remapping SMM is applied to all concept vectors in the first and second concept vector set to obtain an ordered sequence of remapped concept vectors so that each remapped concept vector has a minimal concept distance measure in relation to at least one concept vector of the respective other concept vector set.

According to an embodiment, the similarity remapping SMM is continued to all N concept vector sets to obtain an ordered sequence of remapped concept vectors so that each remapped concept vector has a minimal concept distance measure in relation to all concept vectors of all respective other concept vector sets.

According to an embodiment, terms within the concept vectors are ordered by their semantic probability. According to a further embodiment, values of the corresponding semantic probability are added to build a Euclidean norm as a vector for the further calculation of a Euclidean distance. The square root of the total sum of added squared values of the corresponding semantic probability may be joined to express a Euclidian norm of a concept for each term.

According to an embodiment, a normalization of the probabilities of each term in relation to a particular concept is determined.

According to an embodiment, previous calculation acts are validated by verifying that the squared total sum of the added values of the corresponding semantic probability is equal to a value of one.

The resulting similarity sequence SSQ1 of the remapped concept vector set CVS1 of the first corpus C1 is: $c_{\pi(1,1)}^1$ $c_{\pi(1,2)}^1 \ldots c_{\pi(1,N)}^1$. The resulting similarity sequence SSQ2 of the remapped concept vector set CVS2 of the second corpus C2 is: $c_{\pi(2,1)}^2$ $c_{\pi(2,2)}^2 \ldots c_{\pi(2,N)}^2$. Additionally, the resulting similarity sequence SSQT of the remapped concept vector set CVST of the $T^{th}$ corpus CT is: $c_{\pi(T,1)}^T$ $c_{\pi(T,2)}^T \ldots c_{\pi(T,N)}^T$.

Eventually, the remapped concept vector sets including the resulting similarity sequences SSQ1, SSQ2, ..., SSQT are output for a semantic trend analysis TRD of the text corpora C1, C2, ..., CT. Each of the resulting similarity sequences SSQ1, SSQ2, ..., SSQT is itself a concept vector set SSQ1, SSQ2, ..., SSQT, or more precisely, a remapped concept vector set SSQ1, SSQ2, ..., SSQT.

While the latest similarity sequences SSQT may be referred to as a current model, previous similarity sequences SSQ1, SSQ2 may be referred to as reference models in relation to the current model.

According to an embodiment, a comparison of the terms of a concept vector of a previous reference model and the terms of a concept vector of the actual model is made by joining identical terms along with the previously determined concept vectors.

According to an embodiment, a term distance of identical terms in two or more concept vectors is determined, e.g., by calculating the Euclidean distance between these identic terms. If the concept vectors contain one or more disparate terms, the probability values corresponding with these disparate terms are summed up.

According to an embodiment, the concept distance is determined by calculating a Euclidean distance between all concepts. The minimum distance (by definition) corresponds to the matching concept, because the vector distance between remapped concept vectors has been determined to be a minimum in relation to all concept vectors. The maximum distance corresponds to a value of $\sqrt{2}$.

According to an embodiment, a concept mapping is determined by mapping concept vectors of a previous reference model and the current model by their respective concept distance. The order of the best matching concepts, including their distances, may advantageously visualized. In addition, the two best-matching concepts are reviewed in terms of their concept distance in order to examine their selectivity, distinctiveness, or their significance. For instance, a distance factor near 1 may be assessed as indistinct while higher distance factors indicate a higher degree of selectivity or distinctiveness.

According to an embodiment, a graphical presentation of the results, including the top ranked concepts along with their terms is provided.

Further statistical distance-based procedures and subsequent significance tests—maintaining the allocation of the vector elements prior to the remapping—allows for a derivation of trends, particularly dynamically or temporal trends, e.g. for evaluating trends of a threat analysis over time allowing for an early and proactive recognition of possible changes. Further on, instant identification of underlying problems and constitutive factors is possible, such as structuralizing the observed threat landscape and its observation over time, indicating, and deriving trends, etc.

The subsequent trend derivation results using results from the similarity remapping may be achieved. The feature of trend derivation advantageously includes a predictive analysis of text corpora in order to analyze future developments including an assessment of future threats or risks.

The text analysis module TAN may use the Latent Dirichlet Allocation (LDA) to make inferences regarding the properties of the acquired corpora. LDA involves a prior distribution on a set of latent concept variables. These latent concept variables are indexed by a particular set of hyperparameters. Even though these hyperparameters have a large impact on inference of the text analysis, they may be chosen either in an ad-hoc manner, or by applying an algorithm whose theoretical basis has not been firmly established. In the following sections an advantageous preparatory or runtime adaption of hyperparameters according to an embodiment is described.

Figure 2:
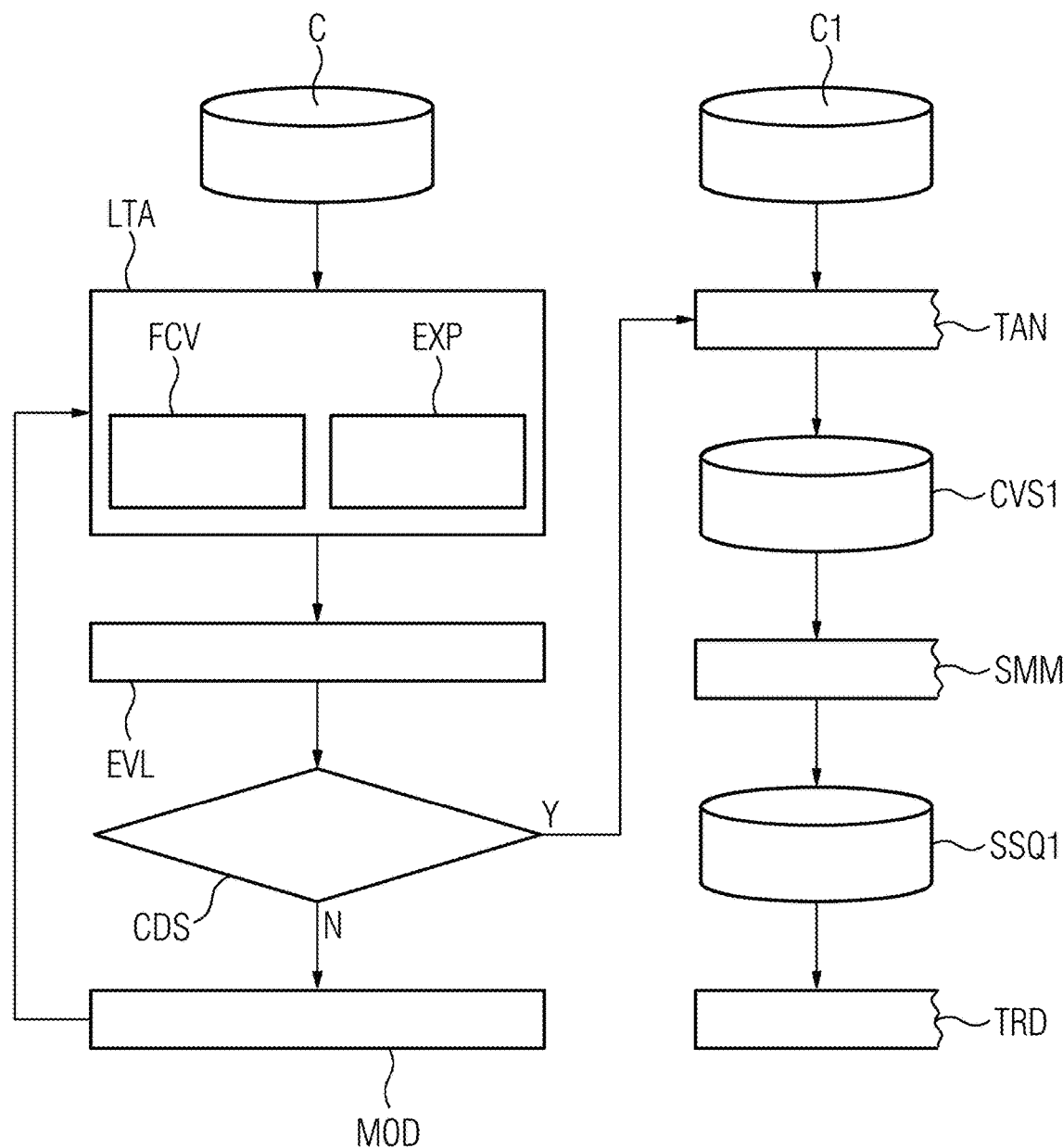
FIG. 2 depicts a schematic view of different components associated with a preparatory or runtime adaption of hyperparameters which are optionally fed to the semantic analysis according to an embodiment.

FIG. 2 depicts a schematic view of different components associated with a preparatory or runtime adaption of hyperparameters which are evaluated and eventually fed to the semantic analysis module TAN known of FIG. 1.

A text corpus C is acquired for training purposes and fed into a text analysis module LTA in which a recursive process is started by an explanation operation EXP for explaining the textual information as acquired from corpus C as a concept distribution vector and a finding operation FCV in which concepts are retrieved as a keyword probability vector. Both operations FCV, EXP are in broad conformance with operations executed by the analysis module TAN as known from FIG. 1 with the important difference, however, that the analysis module LTA of FIG. 2 aims for a concurrent or preemptive determination of hyperparameters concurrently or subsequently used in the analysis module TAN as known from FIG. 1.

In a further operation act EVL, a significance of the concept space determined by the analysis module LTA is evaluated in terms of a significant distance between concepts in the concept space. By a subsequent decision act CDS, a determination is made whether the concept distances are exceeding an adjustable level of significance. If this is the case, (e.g., represented by a branch Y (»Yes«) horizontally pointing to the right), hyperparameters determined by the text analysis module LTA are transferred to the text analysis module TAN. If the concept distances are not significant enough, (e.g., represented by a branch N (»No«) vertically pointing down), a modification act MOD is initiated, in which the operation is recurred with modified hyperparameters to the text analysis module LTA for further training operations.

The recursive operation as shown in FIG. 2 for determining a set of optimized hyperparameters is particularly configured to the particular use case, (e.g., evaluating text corpora with the aim threat identification and prevention). The set of hyperparameters may be used for adjusting the probabilistic concept model in terms of: manipulating the concepts that are used to make a probabilistic determination, (e.g., for reducing an influence of concepts known to be irrelevant); manipulating the corresponding terms and semantic probabilities, (e.g., for influencing a semantic probability of a corresponding term); and/or proving an influence of selected hyperparameters, (e.g., providing reasons for a change of particular hyperparameters in order to inflect a rationale for provide their own value which is combined with other user values as well as the computed value).

The present embodiments overcome the shortcomings of merely analyzing text corpora by a generative, randomly based probabilistic concept model by extending this concept with an additional dynamic component of a similarity remapping.

For a concept matching according to the embodiments, two concept vectors obtained by the probabilistic accroach are refined by a distance-based procedure using, e.g., a Euclidean distance. Thereby all combinations are tested against each other with regard to a »best fit«, whereby a concept vector of a first point in time and concept vector of a subsequent point in time are matched with the lowest distance of their terms. Optionally, the distances to neighboring concepts may be determined additionally in order to determine the selectivity or distinctiveness. The results may be held in the system to allow for a further trend or temporal analysis.

Advantageously, the embodiments are suitable for alerting analysts of possible relevant or emerging issues in a threat landscape emphasizing critical terms of key issues. Another aspect of determining overlaps between concepts, i.e., relevance of terminology within two or more concepts, as well as the temporal development of both, concepts and terms may provide essential information.

The embodiments advantageously provide methods and systems for a trend calculation, including extrapolation operations, in order to derive possible future developments and tendencies of thematic or conceptual developments.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for a semantic analysis of textual data, the method comprising:
    acquiring a first text corpus and a second text corpus, wherein each of the first text corpus and the second text corpus comprises textual data to be analyzed;
    applying a probabilistic concept model to each of the first text corpus and the second text corpus to respectively generate a first concept vector set associated with the first text corpus and a second concept vector set associated with the second text corpus, wherein each concept vector set of the first concept vector set and the second concept vector set comprises a set of concept vectors and each concept vector comprises a plurality of terms semantically corresponding to a semantic concept and a semantic probability assigned to each term of the plurality of terms;
    applying a similarity remapping to at least one concept vector in the first concept vector set and the second concept vector set to obtain an ordered sequence of remapped concept vectors so that each remapped concept vector has a minimal concept distance measure in relation to at least one concept vector of the respective other concept vector set, wherein the similarity remapping of the at least one concept vector comprises a permutation of the plurality of terms of the respective concept vector; and
    outputting the ordered sequence of the remapped concept vectors of the first concept vector set and the second concept vector set for a semantic trend analysis of the first text corpus and the second text corpus.

2. The method of claim 1, wherein the acquiring of the first text corpus and the second text corpus is conducted at subsequent points in time.

3. The method of claim 1, wherein the textual data is imported from disparate textual corpora.

4. The method of claim 1, wherein the probabilistic concept model comprises a Latent Dirichlet Allocation.

5. The method of claim 1, wherein a set of hyperparameters is used for adjusting the probabilistic concept model in terms of:
manipulating concepts used to make a probabilistic determination;
manipulating the corresponding terms and the semantic probabilities; and/or
proving an influence of selected hyperparameters.

6. The method of claim 5, wherein the manipulating of the concepts is used for reducing an influence of concepts known to be irrelevant.

7. The method of claim 5, wherein the manipulating of the corresponding terms and the semantic probabilities is used for influencing a respective semantic probability of a corresponding term.

8. The method of claim 5, wherein the proving of the influence of the selected hyperparameters comprises providing reasons for a change of particular hyperparameters in order to inflect a rationale for proving a value of the respective hyperparameter which is combined with other user values as well as a computed value.

9. The method of claim 1, wherein obtaining the minimal concept distance measure between corresponding elements of two or more concept vectors comprises: defining a Euclidian distance of the two or more concept vectors of the corresponding terms and the semantic probabilities as the minimal concept distance measure; and/or defining a Minkowski distance of the two or more concept vectors of the corresponding terms and the semantic probabilities as the minimal concept distance measure, and
wherein the minimal concept distance measure is obtained to identify similar or distinct concepts.

10. The method of claim 1, further comprising:
evaluating a distinctiveness between one of the concept vectors with at least one other of the concept vectors amongst the ordered sequence of the remapped concept vectors.

11. The method of claim 1, wherein the outputting of the ordered sequence comprises a temporally ordered visualization of the remapped concept vectors along with at least one term of the plurality of terms.

12. An analysis engine for a semantic analysis of textual data comprising:
at least one processor; and
at least one data storage device having stored thereon computer executable program code, which, when executed by the at least one processor, causes the at least one processor to:
acquire a first text corpus and a second text corpus, wherein each of the first text corpus and the second text corpus comprises textual data to be analyzed;
apply a probabilistic concept model to each of the first text corpus and the second text corpus to respectively generate a first concept vector set associated with the first text corpus and a second concept vector set associated with the second text corpus, wherein each concept vector set of the first concept vector set and the second concept vector set comprises a set of concept vectors and each concept vector comprises a plurality of terms semantically corresponding to a semantic concept and a semantic probability assigned to each term of the plurality of terms;
apply a similarity remapping to at least one concept vector in the first concept vector set and the second concept vector set to obtain an ordered sequence of remapped concept vectors so that each remapped concept vector has a minimal concept distance measure in relation to at least one concept vector of the respective other concept vector set, wherein the similarity remapping of the at least one concept vector comprises a permutation of the plurality of terms of the respective concept vector; and
output the ordered sequence of the remapped concept vectors of the first concept vector set and the second concept vector set for a semantic trend analysis of the first text corpus and the second text corpus.

13. The analysis engine of claim 12, wherein the first text corpus and the second text corpus are acquired at subsequent points in time.

14. A non-transitory computer-readable storage medium having stored thereon computer executable program code, which, when executed by a computer, causes the computer to:
acquire a first text corpus and a second text corpus, wherein each of the first text corpus and the second text corpus comprises textual data to be analyzed;
apply a probabilistic concept model to each of the first text corpus and the second text corpus to respectively generate a first concept vector set associated with the first text corpus and a second concept vector set associated with the second text corpus, wherein each concept vector set of the first concept vector set and the second concept vector set comprises a set of concept vectors and each concept vector comprises a plurality of terms semantically corresponding to a semantic concept and a semantic probability assigned to each term of the plurality of terms;
apply a similarity remapping to at least one concept vector in the first concept vector set and the second concept vector set to obtain an ordered sequence of remapped concept vectors so that each remapped concept vector has a minimal concept distance measure in relation to at least one concept vector of the respective other concept vector set, wherein the similarity remapping of the at least one concept vector comprises a permutation of the plurality of terms of the respective concept vector; and
output the ordered sequence of the remapped concept vectors of the first concept vector set and the second concept vector set for a semantic trend analysis of the first text corpus and the second text corpus.

15. The non-transitory computer-readable storage medium of claim 14, wherein the first text corpus and the second text corpus are acquired at subsequent points in time.

16. The analysis engine of claim 12, wherein a set of hyperparameters is used for adjusting the probabilistic concept model in terms of:
manipulation of concepts used to make a probabilistic determination;
manipulation of the corresponding terms and the semantic probabilities; and/or
proof an influence of selected hyperparameters.

17. The analysis engine of claim 16, wherein the manipulation of the concepts is configured to reduce an influence of concepts known to be irrelevant.

18. The analysis engine of claim 16, wherein the manipulation of the corresponding terms and the semantic probabilities is configured to influence a respective semantic probability of a corresponding term.

19. The analysis engine of claim 16, wherein the proof of the influence of the selected hyperparameters comprises providing reasons for a change of particular hyperparameters in order to inflect a rationale for proving a value of the respective hyperparameter which is combined with other user values as well as a computed value.

\* \* \* \* \*